US008656402B2

(12) United States Patent
Brown et al.

(10) Patent No.: US 8,656,402 B2
(45) Date of Patent: Feb. 18, 2014

(54) INCREMENTAL WEB CONTAINER GROWTH TO CONTROL STARTUP REQUEST FLOODING

(75) Inventors: Kyle Gene Brown, Apex, NC (US); Stacy Renee Joines, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2008 days.

(21) Appl. No.: 11/213,001

(22) Filed: Aug. 26, 2005

(65) Prior Publication Data

US 2007/0050768 A1    Mar. 1, 2007

(51) Int. Cl.
*G06F 9/46*     (2006.01)
*G06F 13/00*    (2006.01)
*G06F 15/16*    (2006.01)

(52) U.S. Cl.
USPC ........... 718/104; 719/318; 709/223; 709/224; 709/225; 709/226; 709/227

(58) Field of Classification Search
USPC ........... 719/318; 718/1, 100, 104, 105; 713/1, 713/2, 100
See application file for complete search history.

(56) References Cited

U.S. PATENT DOCUMENTS

| | | | | |
|---|---|---|---|---|
| 6,542,920 | B1 * | 4/2003 | Belkin et al. .................. | 718/104 |
| 6,721,686 | B2 | 4/2004 | Malmskog et al. ........... | 702/186 |
| 6,738,773 | B1 | 5/2004 | Reunert et al. ................. | 707/10 |
| 2002/0161868 | A1 | 10/2002 | Paul et al. ..................... | 709/221 |
| 2003/0023798 | A1 | 1/2003 | Appleby et al. .............. | 710/240 |
| 2003/0099197 | A1 | 5/2003 | Yokota et al. ................. | 370/230 |
| 2003/0110242 | A1 | 6/2003 | Brown et al. .................. | 709/222 |
| 2003/0131141 | A1 * | 7/2003 | Springmeyer et al. ........ | 709/310 |
| 2004/0088413 | A1 * | 5/2004 | Bhogi et al. .................. | 709/226 |
| 2004/0107362 | A1 | 6/2004 | Ravishankar et al. ........ | 713/201 |
| 2004/0236846 | A1 | 11/2004 | Alvarez et al. ................ | 709/223 |
| 2004/0246897 | A1 | 12/2004 | Ma et al. ....................... | 370/230 |
| 2005/0149908 | A1 * | 7/2005 | Klianev ......................... | 717/109 |
| 2005/0262507 | A1 * | 11/2005 | Langen et al. ................. | 718/100 |

OTHER PUBLICATIONS

Chang et al., "Dynamic Computation of TCP Maximum Window Size for Directly Connected Hosts", IBM Technical Disclosure Bulletin, vol. 37, No. 04A, Apr. 1994, pp. 601-607.
Banerjee et al., Monitoring Thread Usage to Dynamically Control a Thread Pool, Oct. 16, 2003.

* cited by examiner

*Primary Examiner* — H S Sough
*Assistant Examiner* — Phuong Hoang
(74) *Attorney, Agent, or Firm* — Lee Law, PLLC; Christopher B. Lee (57) ABSTRACT

A computer implemented method, an apparatus, and a computer usable program product for controlling startup request flooding. An application server instance is started. If the application server instance is throttled during a startup interval, a Web container thread manager is initiated. If the Web container thread manager identifies it is time to increment a Web container maximum thread pool size for the application server instance, the application server instance is notified to increment its Web container maximum thread pool size by a programmable amount. If the Web container maximum thread pool size for the application server instance has not reached a final maximum thread pool size, and if the startup interval for the application server instance has not completed, the Web container thread manager is suspended for an interval, after which the Web container thread manager identifies if it is time to increment the Web container maximum thread pool size for the application server instance.

18 Claims, 4 Drawing Sheets

INCREMENTAL WEB CONTAINER GROWTH TO CONTROL STARTUP REQUEST FLOODING

BACKGROUND OF THE INVENTION

1. Field of the Invention

The present invention relates generally to an improved data processing system and, in particular, to a computer implemented method, an apparatus, and a computer usable program product for optimizing performance in a data processing system. Still more particularly, the present invention provides a method, system, and computer program product for enhancing performance by controlling startup request flooding by incrementally growing a Web container.

2. Description of the Related Art

Enterprise Java Beans (EJB) technology is the server-side component architecture for the Java™ 2 Platform, Enterprise Edition (J2EE) platform (Java is a trademark of Sun Microsystems, Inc. in the United States, other countries, or both). EJB technology enables rapid and simplified development of distributed, transactional, secure and portable applications based on Java™ technology.

A cluster is a group of application servers that transparently runs a J2EE application as if it were a single entity. A J2EE instance is a unit in the J2EE cluster, which can be started, stopped, and monitored separately. It runs on a physical server, but it is also possible to run several instances on one server. An instance is identified by a System ID (SID) and an instance number. Central Services are a special example of the J2EE instance. Another special instance is the one that installed the Software Deployment Manager (SDM). This one usually runs with the database and Central Services on the same machine and is then indicated as the central instance.

The J2EE instance contains at least one Server Process. Normally the J2EE instance comprises one J2EE Dispatcher and several server processes. The J2EE instance is started and stopped by the J2EE Startup and Control Framework. For example, the J2EE dispatcher receives the request, selects a server process for the processing and establishes the connection from a client to the server.

J2EE Web sites frequently experience failures shortly after the application server starts up or is restarted after a failure. Often, Web sites activate new application server instances to provide additional capacity during intense periods of activity. Also, many J2EE application servers automatically restart failed instances to automatically maintain site capacity.

However, a freshly started J2EE application server instance usually does not have the same capacity as a longer-lived application server instance operating at steady-state. The difference is in the startup required for the newly started instance to fully optimize key functions, such as the Just-In-Time compiler in the Java™ Virtual Machine, to build critical object pools such as the database connection pools, and to populate caches. Until this occurs, the application server instance requires more of a CPU's time and memory to handle requests.

Most Web sites tune the J2EE application server instance to operate efficiently at steady-state. The plan is to start the application server instances during a time of relative low activity and allow them to startup during off-peak hours. Application server instances start up gradually only because of the transition from off-peak hours to peak hours, not because the startup is controlled or regulated. When the site comes under peak loading, the application server instance will already be at steady state. The application server instance is not tuned to take a flood of requests during startup, as this would require more capacity than the steady-state model, and thus cost more in hardware and software licenses. Most customers do not want to purchase extra capacity they will need infrequently or for very brief periods of time.

However, if the application server instance is flooded with requests during startup, it often fails because it runs out of memory or enters CPU thrashing rather than doing useful work. Of course, simply restarting the application server instance failing under these circumstances simply puts the application server instance in a cycle of failure until the overall site load diminishes sufficiently for the application server instance to come up successfully and achieve steady-state.

During these periods of failure during startup or restart, the user requests routed to the newly started application server instance experience extreme response times or failure. These issues are exposed to the site users, and impact customer satisfaction and the site's perceived reliability.

Most existing solutions to the problem require flow control front-end hardware such as load balancers. However, this equipment focuses on spraying to specific IP addresses and ports. Any plug-in software spraying (frequently provided by the J2EE application server) often defeats the usefulness of the hardware throttling as it hides the application server instances from the hardware balancer. The hardware load balancer may avoid sending requests to the application server instance that is starting up, but the plug-in software sprayer may defeat the purpose of the balancer by redirecting requests to the under-utilized application server instance. Even if the customer chooses to force a topology that supports hardware throttling, coordination of the throttling mechanism and timing requires coordination between the network team and the J2EE Web site team. Often this is difficult to achieve due to the customer's organization structure. In these cases, the J2EE Web site team would like a reliable mechanism they could configure without outside help to control request flow to newly started application server instances.

SUMMARY OF THE INVENTION

The present invention provides a computer implemented method, an apparatus, and a computer usable program product for controlling startup request flooding. Flooding is controlled by increasing available web container threads over a programmable interval by programmable increments. An application server instance is started. If the application server instance is throttled during a startup interval, a Web container thread manager is initiated. If the Web container thread manager identifies it is time to increment a Web container maximum thread pool size for the application server instance, the application server instance is notified to increment its Web container maximum thread pool size by a programmable amount. If the Web container maximum thread pool size for the application server instance has not reached a programmable final maximum thread pool size, and if the startup interval for the application server instance has not completed, the Web container thread manager is suspended for a programmable interval, after which the Web container thread manager identifies if it is time to increment the Web container maximum thread pool size for the application server instance.

BRIEF DESCRIPTION OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
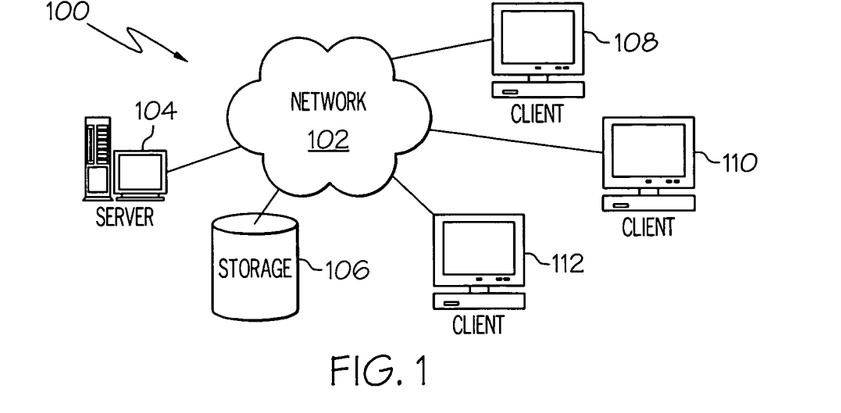
FIG. 1 is a pictorial representation of a data processing system in which the present invention may be implemented, according to an illustrative embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
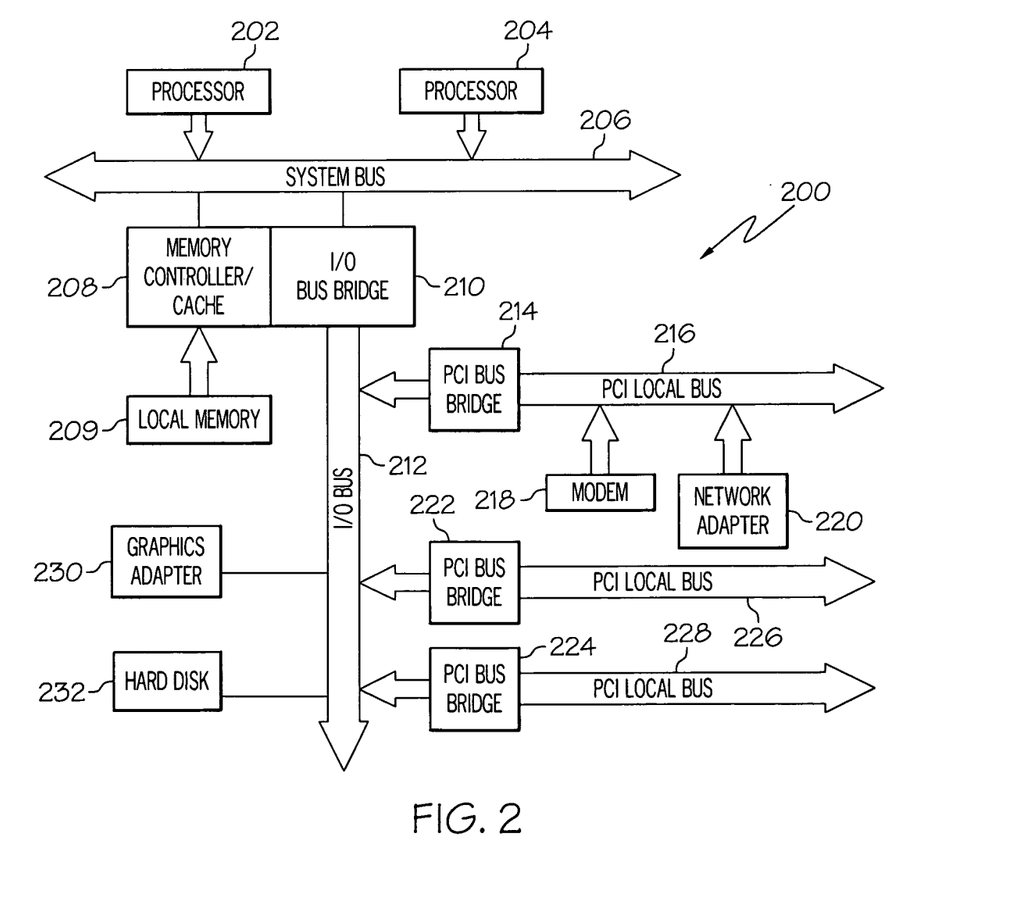
FIG. 2 is a block diagram of a data processing system that may be implemented as a server in which the present invention may be implemented, according to an illustrative embodiment of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, a product of International Business Machines Corporation in Armonk, N.Y., running the Advanced Interactive Executive (AIX) operating system or the LINUX operating system.

Figure 3:
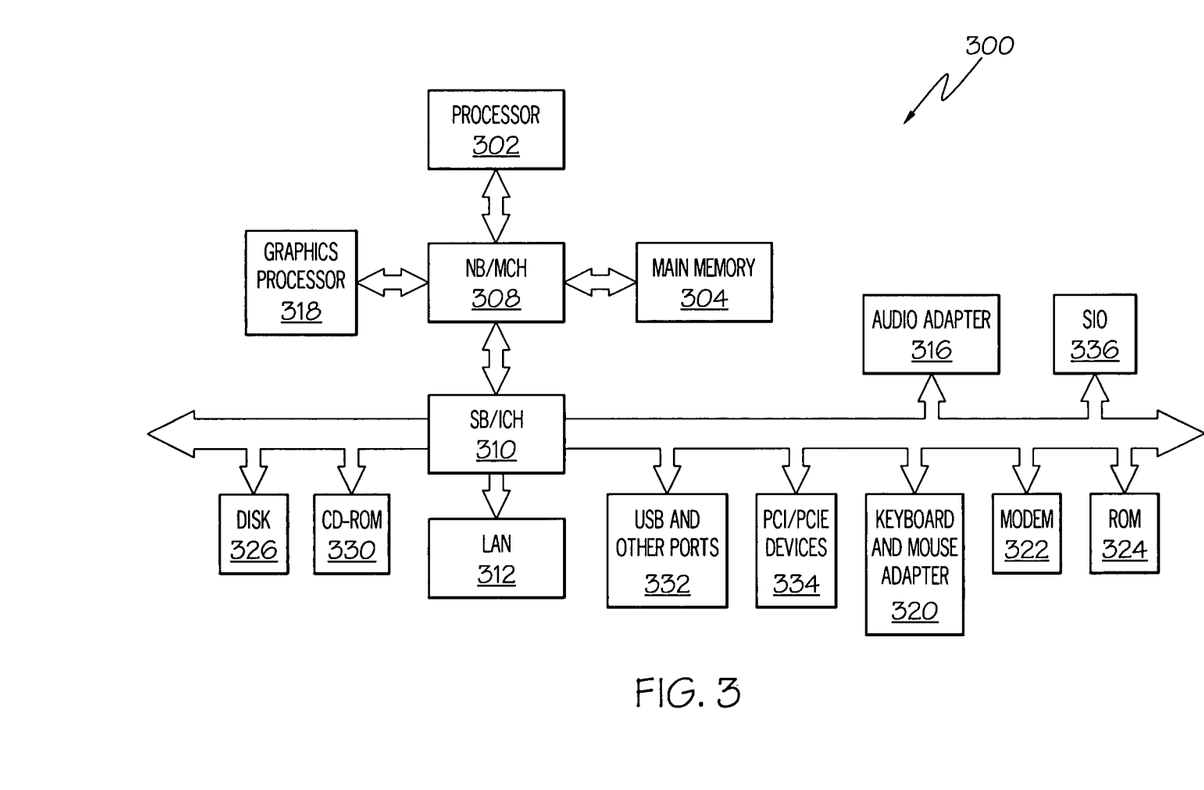
FIG. 3 is a block diagram illustrating a data processing system in which the present invention may be implemented, according to an illustrative embodiment of the present invention.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (NB/MCH) 308 and a south bridge and input/output (I/O) controller hub (SB/ICH) 310. Processor 302, main memory 304, and graphics processor 318 are connected to NB/MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communication ports 332, and PCI/PCIe devices 334 connect to SB/ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). HDD 326 and CD-ROM drive 330 may use, for example, an integrated drive electronics (IDE) or serial advanced technology attachment (SATA) interface. A super I/O (SIO) device 336 may be connected to SB/ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 300.

Instructions for the operating system, the object-oriented programming system, and applications or programs are located on storage devices, such as HDD 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

The present invention is a computer implemented method, an apparatus, and a computer usable program product for controlling startup request flooding. The mechanism of the present invention may be executed on a server, such as server 104 in FIG. 1, communicating through a network, such as network 102, with clients, such as client 108, client 110, and client 112. The processes of the present invention are performed by processor 302 using computer implemented instructions, which may be located in a memory such as, for example, main memory 304, ROM 324, or in one or more peripheral devices 326-330.

The present invention provides a light-weight throttling mechanism to increase the size of the Web container thread pool by specified amounts over a specified interval via the Web container thread manager. The present invention controls the traffic serviced by newly started application server instances by controlling the Web container maximum thread pool size for the application server instances. By starting with an initially low number of threads, the application server instance has time to build its caches, pools, and optimizations. Over time, the Web container maximum thread pool size grows by increments, allowing increasing amounts of traffic into the application server instance until, at steady-state, the application server instance receives its full portion of Web container threads to handle a full set of requests.

The Web container thread manager integrates with existing Web container thread pool resource managers such as those commonly found in the J2EE application servers. However, the Web container thread manager provides the additional logic for growing the maximum size of the pool over an interval in pre-defined increments. It increases the Web container thread pool maximum by either notifying the Web container to increase its maximum limit, or setting the limit directly via variables shared with the Web container.

Figure 4:
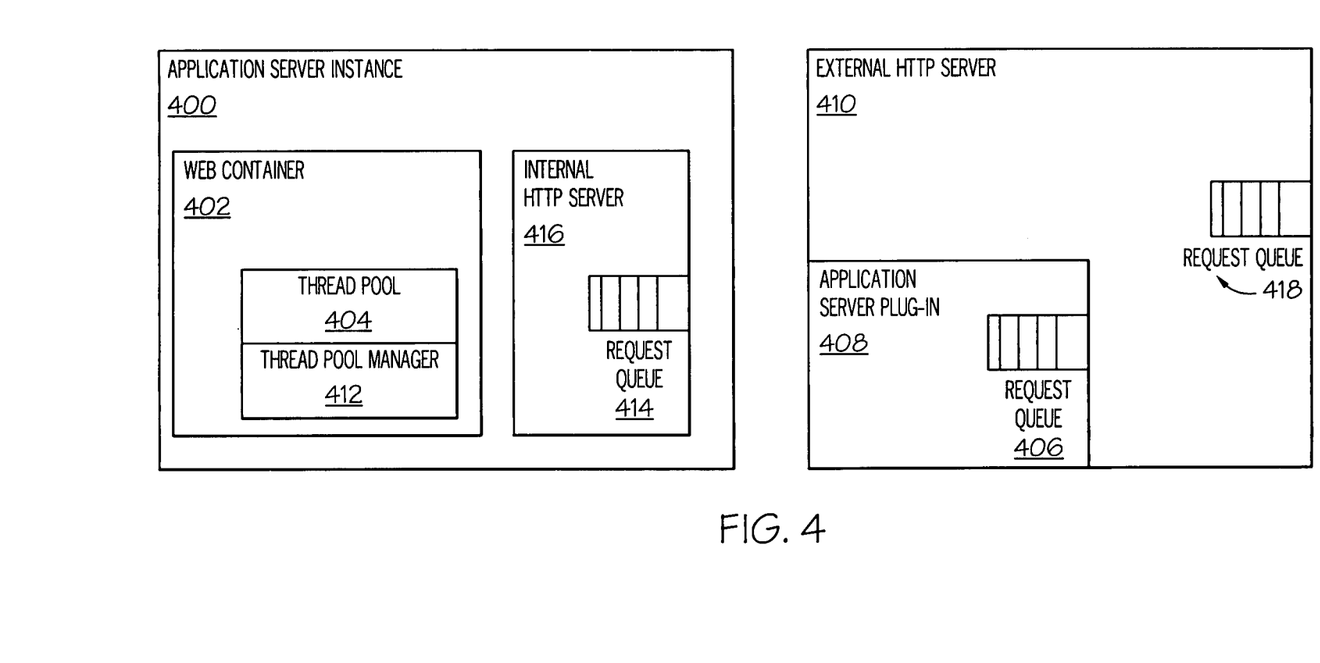
FIG. 4 is a block diagram of components for incrementally growing a Web container in accordance with an illustrative embodiment of the present invention.

FIG. 4 is a block diagram of components for incrementally growing a Web container in accordance with an illustrative embodiment of the present invention. The mechanism of the present invention uses Web container 402 to control the work undertaken by the newly started application server instance 400. The Web container uses thread pool 404 to control the number of incoming requests concurrently serviced. When the thread pool's maximum size is reached, the Web container does not attempt to service more incoming requests until the incoming request that is currently running completes and makes a thread available for a subsequent incoming request. Until a thread becomes available, incoming requests queue via one or more of the existing application server queuing mechanisms, including request queue 406 in application server's plug-in 408, request queue 418 located in external http server 410 and/or request queue 414 in application server's internal http server 416, until they can be serviced. If application server instance 400 is throttled at any time during the startup interval, Web container thread manager 412 is initiated to control the maximum size of thread pool 404.

Figure 5:
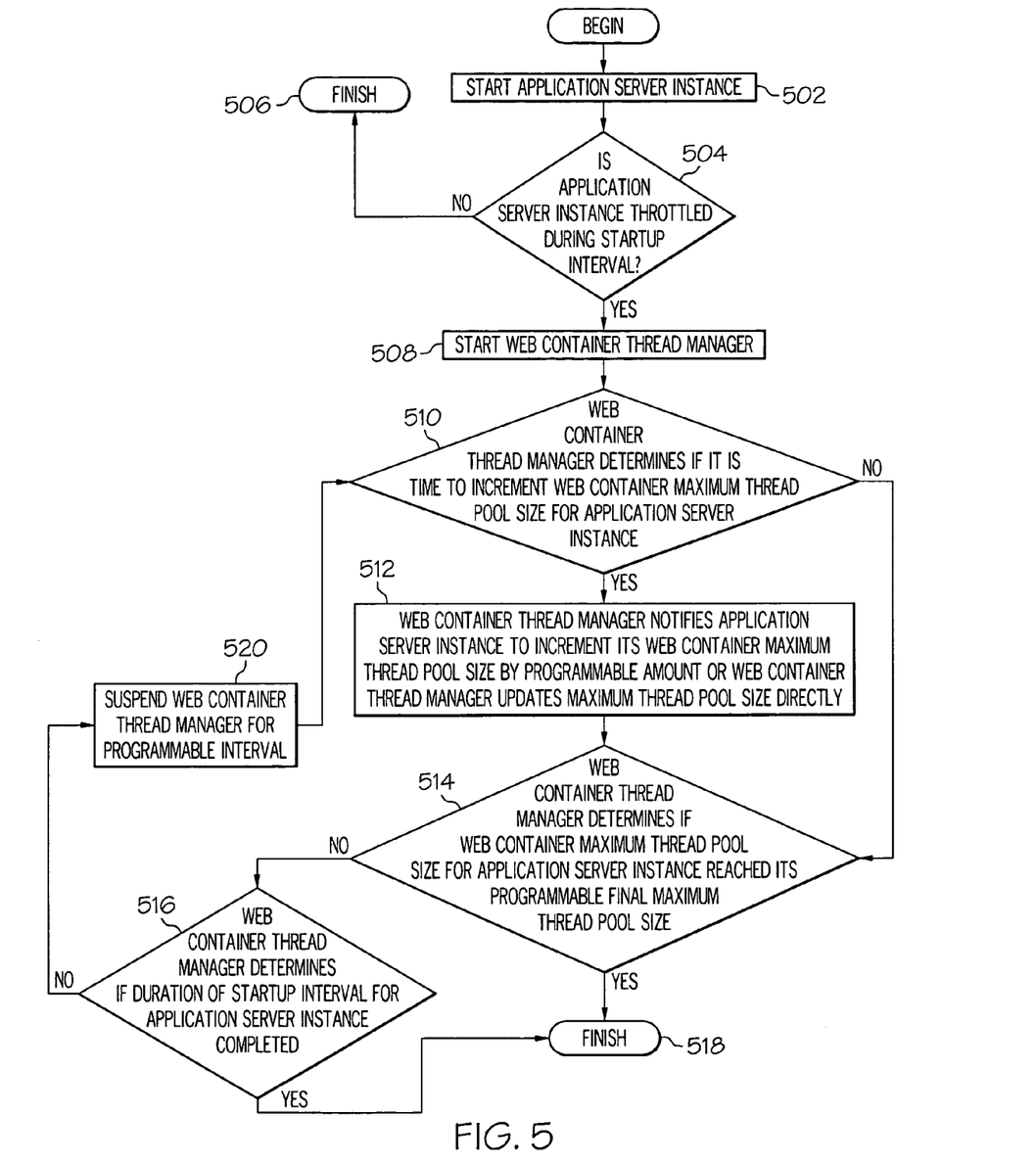
FIG. 5 is a flowchart of the process for incrementally growing a Web container in accordance with an illustrative embodiment of the present invention.

FIG. 5 is a flowchart of the process for incrementally growing a Web container in accordance with an illustrative embodiment of the present invention, using components depicted in FIG. 4. After an application server instance is started (Step 502), the application server instance checks to determine if the application server instance is throttled during the startup interval (Step 504). If the application server instance is not throttled during the startup interval, the need to control the application server instance during the startup interval ends (Step 506). However, if the application server instance is throttled at any time during the startup interval, the Web container thread manager is initiated in conjunction with the newly started application server instance to control the maximum size of the Web container thread pool (Step 508). The Web container thread manager lives until the startup interval, defined by the Web site team, for the application server instance is complete. The Web container thread manager can run as a separate process, or as a thread within the application server instance itself. The Web container thread manager periodically identifies whether if it is time to increment the Web container maximum thread pool size beyond its current maximum thread pool size (Step 510). The Web container maximum thread pool size is programmed for an initial maximum thread pool size to be used before the startup interval and a final maximum thread pool size to be used at the end of the startup interval. The Web container maximum thread pool size is also incremented periodically by the application server instance during the startup interval, as described below.

If it is time to increment the Web container maximum thread pool size, the Web container thread manager notifies the application server instance to increment its Web container maximum thread pool size by a programmable amount (Step 512). The Web container thread manager can notify either the application server instance or the Web container for the application server instance to increment the Web container maximum thread pool size. Alternatively, the Web container thread manager may increase the Web container maximum thread pool size directly. In this case, the updated maximum replaces the previously current maximum referenced by the Web container, but without notification or action by the Web container to the application server instance or the Web container for the application server instance to make the change.

If the Web container thread manager notifies the application server instance to increment its Web container maximum thread pool size by a programmable amount, or if it is not yet time to increment the Web container maximum thread pool size, the Web container thread manager verifies if the Web container maximum thread pool size has reached its programmable final maximum thread pool size (Step 514). If the Web container maximum thread pool size has reached its programmable final maximum thread pool size, the Web container thread manager is finished (Step 518).

If the Web container maximum thread pool size has not reached its programmable final maximum thread pool size, the Web container thread manager establishes if the duration of the startup interval for the application server instance is complete (Step 516). If the duration of the startup interval for the application server instance is complete, the Web container thread manager is finished (Step 518).

If the duration of the startup interval for the application server instance is not complete, the Web container thread manager is suspended for a programmable interval (Step 520). After the Web container thread manager has been suspended for the programmable interval, the Web container thread manager returns to Step 510 to identify whether it is time to increment the Web container maximum thread pool size beyond its maximum thread pool size.

For example, the Web site team could program the Web container initial maximum thread pool size to be 10 threads, and further program the Web container thread manager to increase the Web container maximum thread pool size by 5 threads every 3 minutes until the Web container maximum thread pool size reaches the Web container final maximum thread pool size of 50 threads, 24 minutes later.

During the startup interval, incoming requests are queued via the application server request queue. This queuing may be implemented in one or more mechanisms, such as http Server request queuing, queuing within the application server's plugin, or the application server's internal request manager, such as a built-in http server. While these requests may experience longer response times than those arriving at a steady-state application server instance, they will receive service from the newly started application server instance. Also, response time will steadily improve as the application server instance handles more requests over time, and handles them more efficiently. Also, the present invention greatly reduces the likelihood the application server instance will fail under an initial heavy flood of requests. It also operates behind the application server plug-in level and cannot be defeated by plug-in software routing. Additionally, it requires no outside hardware routing or pacing to control, and can be managed by the J2EE Web site team.

Therefore, the mechanism of the present invention, described above, controls the traffic serviced by newly started application server instances, and avoids flooding by controlling the Web container maximum thread pool size for the application server instance.

The present invention provides additional benefits beyond a simple Web container thread pool (such as common J2EE thread pools) in that it prevents a newly-started application server instance receiving heavy load from allocating and engaging its final, maximum thread pool size until the system is properly initialized, and can handle the load. Without this mechanism, simple Web container thread pools grow to their final, maximum size too quickly, which may cause a failure.

The Web container thread manager may be limited in its activity and duration, as it is only needed during the startup interval for the application server instance. Some embodiments of the present invention may allow the process or thread executing the Web container thread manager to terminate after the startup interval is complete so it is not active during normal steady-state operation. This provides additional performance benefits in reduced CPU cycles and memory footprints. This termination feature also further differentiates the present invention from thread pool managers, which must remain active throughout the application server instance's runtime to control the more basic operation of the Web container thread pool.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for controlling startup request flooding, the method comprising:

responsive to starting an application server instance as a process executing on a physical server device, initiating a web container thread pool manager and setting a web container thread pool at a size;

incrementing, via the web container thread pool manager, the size of the web container thread pool each time an event occurs to allow for increasing amounts of traffic until a programmable final maximum thread pool size is reached for the web container thread pool;

verifying if the size of the web container thread pool for the application server instance reached the programmable final maximum thread pool size;

terminating the web container thread pool manager upon the programmable final maximum thread pool size for the web container thread pool being reached;

responsive to verifying the size of the web container thread pool for the application server instance has not reached the programmable final maximum thread pool size, establishing if a startup interval for the application server instance has completed;

responsive to establishing the startup interval for the application server instance has not completed, suspending the web container thread pool manager for a programmable interval; and responsive to suspending the web container thread pool manager for the programmable interval, returning to the step that increments the size of the web container thread pool for the application server instance.

2. The computer implemented method of claim 1, wherein the event is a periodic event.

3. The computer implemented method of claim 1, further comprising:

initiating a starting step only if the application server instance is throttled during the startup interval.

4. The computer implemented method of claim 1, wherein the incrementing step comprises:

identifying, via the web container thread pool manager, whether it is time to increment the size of the web container thread pool for the application server instance; and responsive to identifying it is time to increment the size of the web container thread pool, notifying, via the web container thread pool manager, the application server instance to increment the size of the web container thread pool by a programmable amount.

5. The computer implemented method of claim 1, wherein the programmable final maximum thread pool size is programmed for an initial maximum thread pool size to be used prior to the startup interval.

6. The computer implemented method of claim 1, wherein the setting step is executed by the web container thread pool manager.

7. The computer implemented method of claim 6, wherein the web container thread pool manager notifies a web container for the application server instance, instead of the application server instance, to increment the size of the web container thread pool.

8. The computer implemented method of claim 6, wherein the web container thread pool manager runs as one of a separate process and a thread within the application server instance.

9. The computer implemented method of claim 6, wherein the web container thread pool manager directly increments the size of the web container thread pool by a programmable amount.

10. A data processing system comprising:

a bus;

a storage device connected to the bus, wherein the storage device contains computer usable code;

a communications unit connected to the bus; and a processing unit connected to the bus, wherein the processing unit executes the computer usable code to:

initiate a web container thread pool manager and set a web container thread pool at a size, responsive to starting an application server instance as a process executing on the data processing system;

increment, via the web container thread pool manager, the size of the web container thread pool each time an event occurs to allow for increasing amounts of traffic until a programmable final maximum thread pool size is reached for the web container thread pool;

verify if the size of the web container thread pool for the application server instance reached the programmable final maximum thread pool size;

terminate the web container thread pool manager upon the programmable final maximum thread pool size for the web container thread pool being reached;

establish if a startup interval for the application server instance has completed, responsive to verifying the size of the web container thread pool for the application server instance has not reached the programmable final maximum thread pool size;

suspend the web container thread pool manager for a programmable interval, responsive to establishing the startup interval for the application server instance has not completed; and responsive to suspending the web container thread pool manager for the programmable interval, return to the step that increments the size of the web container thread pool for the application server instance.

11. The data processing system of claim 10, wherein the event is a periodic event.

12. The data processing system of claim 10, wherein the processing unit further executes the computer usable code to initiate a starting step only if the application server instance is throttled during the startup interval.

13. The data processing system of claim 10, wherein in executing the computer usable code to increment, via the web container thread pool manager, the size of the web container thread pool each time the event occurs, the processing unit executes the compute usable code to identify, via the web container thread pool manager, whether it is time to increment the size of the web container thread pool for the application server instance; and notify, via the web container thread pool manager, the application server instance to increment the size of the web container thread pool by a programmable amount, responsive to identifying it is time to increment the size of the web container thread pool.

14. The data processing system of claim 10, wherein the programmable final maximum thread pool size is programmed for an initial maximum thread pool size to be used prior to the startup interval.

15. The data processing system of claim 10, wherein in executing computer usable code to set the web container thread pool at a size, the processing unit executes the compute usable code as part of the web container thread pool manager.

16. The data processing system of claim 15, wherein in executing the computer usable code as part of the web container thread pool manager, the web container thread pool manager notifies a web container for the application server instance, instead of the application server instance, to increment the size of the web container thread pool.

17. The data processing system of claim 15, wherein in executing the computer usable code as part of the web container thread pool manager, the web container thread pool manager runs as one of a separate process and a thread within the application server instance itself.

18. A computer program product for controlling startup request flooding comprising a computer useable storage device [[medium]] having computer useable program code embodied therewith, the computer useable program code, when executed by a processor, causes the processor to perform a method comprising:

responsive to starting an application server instance, initiating a web container thread pool manager and setting a web container thread pool at a size;

incrementing, via the web container thread pool manager, the size of the web container thread pool each time an event occurs to allow for increasing amounts of traffic until a programmable final maximum thread pool size is reached for the web container thread pool;

verifying if the size of the web container thread pool for the application server instance reached the programmable final maximum thread pool size;

terminating the web container thread pool manager upon the programmable final maximum thread pool size for the web container thread pool being reached;

responsive to verifying the size of the web container thread pool for the application server instance has not reached the programmable final maximum thread pool size, establishing if a startup interval for the application server instance has completed;

responsive to establishing the startup interval for the application server instance has not completed, suspending the web container thread pool manager for a programmable interval; and responsive to suspending the web container thread pool manager for the programmable interval, returning to the step that increments the size of the web container thread pool for the application server instance.

* * * * *